Feb. 4, 1958     A. BOECKER     2,822,474

ABSOLUTE VALUE COMPUTER

Filed Feb. 7, 1956

*INVENTOR.*
ALEXANDER BOECKER
BY
*Harry M. Saragovitz*
ATTORNEY

United States Patent Office 2,822,474
Patented Feb. 4, 1958

2,822,474

ABSOLUTE VALUE COMPUTER

Alexander Boecker, East Norwich, N. Y., assignor to the United States of America as represented by the Secretary of the Army Application February 7, 1956, Serial No. 564,096

3 Claims. (Cl. 250—27)

This invention relates to computer circuits adapted to convert input voltages of varying polarity to unidirectional output voltages and more particularly to an electronic computer circuit for generating a unidirectional voltage output proportional to the absolute magnitude of the input voltage.

It is often necessary to derive the absolute value of signals which may vary in polarity with respect to ground. Heretofore, such circuits utilized diodes or crystals as a means of conversion. However, the non-linear resistance variations of such unidirectional devices resulted in inaccurate conversions for small magnitude input signals in the vicinity of 0 volts.

It is therefore an object of the present invention to provide an absolute value computer circuit wherein such limitations are overcome.

It is another object of the present invention to provide an absolute value computer circuit which has a high inherent accuracy.

It is yet another object of the present invention to provide an absolute value computer circuit which delivers at its output a voltage of positive polarity and equal in magnitude to the input voltage with a high degree of precision.

In brief, the absolute value computer includes discrete means responsive to the input signals for simultaneously producing distinct voltages having relative opposite polarities. Also included are first and second cathode followers having discrete input and output circuits, the input circuits being responsive respectively to the voltages of opposite polarity. In addition, there are included discrete means connected between the first cathode follower output circuit and one of the voltage producing means, and between the second cathode follower output circuit and the other voltage producing means whereby unity gain is produced between the input voltage signals and the voltage developed respectively across each of the cathode follower output circuits. Further included are means linking the cathode follower output circuits whereby when the cathode follower having a relative positive voltage applied to its input circuit is rendered conductive to produce a positive output voltage the other cathode follower is rendered non-conductive.

Figure 1:
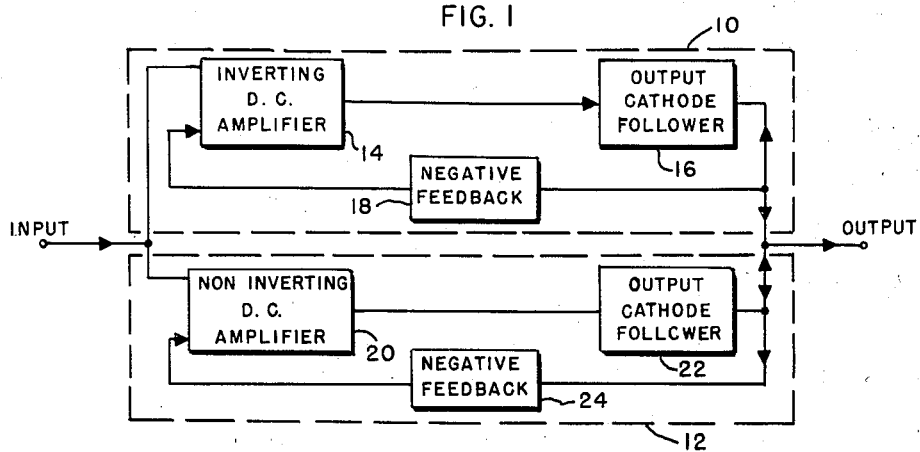
Figure 2:
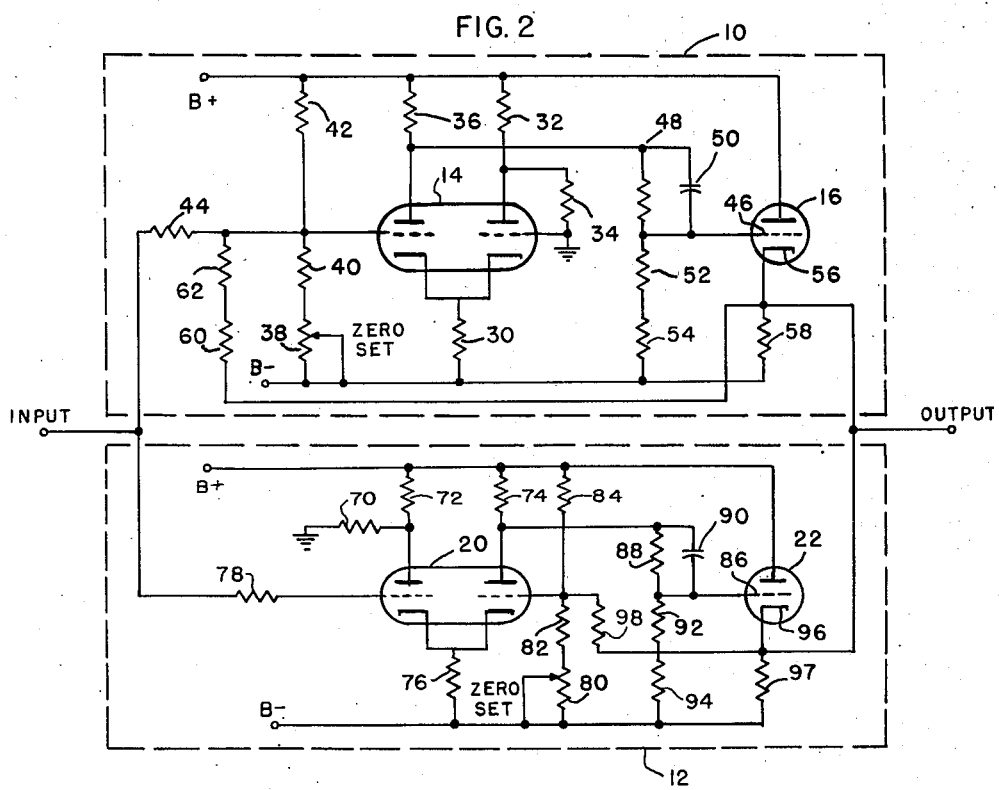

For a better understanding of the invention, together with other and further objects thereof, reference is had to the following description taken in connection with the accompanying drawing in which:

Fig. 1 is a block diagram of the system, and
Fig. 2 is a schematic diagram of the system.

In Fig. 1, the absolute computer is shown as comprising an inverter circuit 10 and a non-inverter circuit 12 having a common output connection and responsive to input signal voltages which may be positive or negative with respect to ground. Inverter circuit 10 includes a direct current amplifier 14 adapted to amplify and invert the input signal, a cathode follower output circuit 16 responsive to the output of amplifier 14, and a negative feedback circuit 18 to provide unity gain for the inverter circuit. Non-inverter circuit 12 includes a direct amplifier 20 adapted to provide amplification without inversion, a cathode follower output circuit 22, and a negative feedback circuit 24 to provide unity gain for non-inverter circuit 12. The outputs of the respective cathode follower circuits are connected in a manner such that the one that develops the positive output takes precedence over the other so that the output from the computer is always of positive polarity and equal in magnitude to the input voltage.

The detailed schematic diagram of the computer is shown in Fig. 2. In inverter circuit 10, the direct-current amplifier 14 to which the input voltage is applied is shown as a twin triode tube with the left hand triode section functioning as the inverting direct-current amplifier and the right hand triode section functioning as a cathode follower to cancel the effects of any heater voltage variations. The cathodes of both triode sections are connected to a B— source through resistor 30. The plate of the cathode follower section is connected to the junction of resistors 32 and 34 serially connected between ground and a B+ source, and the grid of the cathode follower is grounded. The plate of the amplifier section is connected to the B+ source through resistor 36 and the grid of the amplifier section is biased by means of a voltage dividing resistance network connected from B— to B+ consisting respectively of a "zero set" variable resistor 38, and resistor 40 and 42. As shown, the grid of the amplifier is connected to the junction of resistors 40 and 42 and the input voltage is applied to the amplifier grid through resistor 44. The output from the amplifier plate circuit is applied to grid 46 of cathode follower output tube 16 through the parallel arranged circuit of resistor 48 and capacitor 50 which is in series with resistors 52 and 54 connected respectively between grid 46 and B—. Cathode 56 of output tube 16 is connected to B— through resistor 58 and the plate thereof is connected directly to B+. Negative feedback is coupled from cathode 56 to the input grid of the direct-current amplifier through series connected resistors 60 and 62. The values of the resistor elements in the inverter circuit are so chosen, that with both grids of twin triode 14 at ground potential, the output from cathode follower 16 is at ground potential and the gain of the inverter circuit is unity.

Referring now to non-inverter circuit 12, the direct-current amplifier 20, which provides amplification of the input voltage without inversion, is a twin triode with the left hand triode section functioning as a cathode follower and the right hand triode section functioning as the direct-current amplifier. In addition to providing an output voltage having the same polarity as the input signal, this type of direct-current amplifier circuit also provides a balancing effect of the heater voltage variation. The plate of the cathode follower section is connected to the junction of resistors 70 and 72 serially connected between ground and B+ and the plate of the amplifier section is connected to B+ through resistor 74. The cathodes of both sections are connected to B— through resistor 76. The input voltage is applied to the grid of the cathode follower section through resistor 78 and the grid of the amplifier section is biased by means of a voltage dividing resistance network consisting of "zero set" variable resistor 80, and resistors 82 and 84, connected between B— and B+. The grid of the amplifier section is connected to the junction of resistors 82 and 84. The output from the amplifier plate circuit of tube 20 is connected to grid 86 of cathode follower output tube 22 through the parallel arranged circuit of resistor 88 and capacitor 90 which is in series with resistors 92 and 94 connected between grid 86 and B—. Cathode 96 of output tube 22 is connected to B— through resistor 97 and the plate thereof is connected directly to B+. Negative feedback is coupled from cathode 96 to the grid of the amplifier section of tube 20 through resistor 98. As in the case of inverter circuit 10, the values of the resistor elements in non-inverter circuit 12 are so chosen that the output from cathode follower 22 is at ground potential with both grids of tube 20 grounded and the gain of the non-inverter circuit is unity. As shown, the cathode 96 is connected directly to cathode 56 and the output of the absolute value computer is derived from either of these cathodes as hereinbelow described.

In discussing the operation of the computer, let it be assumed that the input signal is positive with respect to ground. This positive input signal is inverted in the plate output circuit of the left section of amplifier 14 and applied to grid 46 of cathode follower output tube 16 as a nagative voltage. Simultaneously, the positive input signal is applied to the left section of amplifier 20 to develop a positive voltage across common cathode resistor 76 which, of course, is the voltage applied to the right section of amplifier 20. Hence, the output from the plate of amplifier 20 is of the same positive polarity as the input signal. The amplified positive signal is applied to grid 86 of output cathode follower tube 22 so that a positive voltage is derived from cathode resistor 97. The positive output signal from cathode follower 22 is applied to cathode 56 of inverter circuit output tube 16 which, with the negative voltage signal applied to grid 46, will cause tube 16 to be cut-off. Thus the only output from the computer will be the positive output signal from cathode 96 of output tube 22. Now let us assume that a negative input voltage is applied to the input of the computer. The voltage applied to grid 46 will now be positive and thus cathode output tube 16 will provide a positive output voltage. On the other hand, the voltage applied to grid 86 of output tube 22 will be negative inasmuch as the output plate voltage from amplifier 20 will be of the same polarity as the input voltage. This negative voltage, together with the positive voltage applied from cathode 56 to cathode 96 will render output tube 22 inoperative. Thus, the circuit that develops the positive output takes precedence over the other so that the output is always of positive polarity. Hence, for either positive or negative inputs the output of the computer will provide a positive voltage signal which, with unity gain provided by the feedback circuits, will be equal in magnitude to the input voltage.

If desired, the direct-current amplifiers in each circuit may be followed by the addition of a second stage of amplification. In this case, the amplifier 14 in the inverter circuit will be designed to provide an output of the same sense as the input voltage, inverted in the additional amplifier and applied to the grid 46 of the cathode follower output tube 16. Similarly, the direct-current amplifier 20 in the non-inverter circuit is designed to invert the input signal so that the output from the additional amplifier will provide a signal having the same sense as the input voltage. The operation of such a system is identical to that described in connection with the preferred embodiment illustrated in Fig. 2. For input voltages in the vicinity of 0 volts, the gain preceding the output tubes will determine how accurately the computer circuit will perform.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A circuit for deriving the absolute magnitude of input voltage signals having positive or negative polarity with respect to ground comprising, discrete means responsive to said input signals for simultaneously producing distinct voltages having relative opposite polarities, first and second cathode followers having discrete input and output circuits, said input circuits being responsive respectively to the voltages of opposite polarity, discrete means connected between the first cathode follower output circuit and one of said voltage producing means, and between said second cathode follower output circuit and the other of said voltage producing means, whereby unity gain is produced between said input voltage signals and the voltages developed respectively across each of said cathode follower output circuits, and means linking the cathode follower output circuits whereby when the cathode follower having a relative positive voltage applied to its input circuit is rendered conductive to produce a positive output signal the other cathode follower is rendered non-conductive.

2. A circuit for deriving the absolute magnitude of input voltage signals comprising, first and second means responsive to said signals for producing distinct voltages having the same and opposite polarity as said input signals, first and second cathode followers having their inputs responsive respectively to said same and opposite polarity voltages and having discrete output circuits, discrete means coupled between the first cathode follower output circuit and said first voltage producing means, and between said second cathode follower output circuit and said second voltage producing means whereby there is produced unity gain between said input voltage signals and the voltages developed respectively across each of said cathode follower output circuits, said cathode follower output circuits being directly connected such that when one of said cathode followers is rendered conductive the other cathode follower is rendered non-conductive.

3. A circuit for deriving the absolute magnitude of input voltage signals comprising, a first and second direct-current amplifier responsive to said input signals for producing distinct voltages having relative opposite polarities, first and second cathode followers having discrete input and output circuits, said input circuits being respectively responsive to the voltages of opposite polarity, a first negative feedback circuit connected between the first cathode follower output circuit and the input to said first amplifier, said negative feedback being of such value that unity gain is produced between said input signal voltage and the voltage developed across the first cathode follower output circuit, a second negative feedback circuit connected between said second cathod follower output circuit and the input to said second amplifier, said feedback being of such value that unity gain is produced between said input signal and the voltage developed across the second cathode follower output circuit, and means linking said cathode follower output circuits whereby when the cathode follower having a relative positive voltage applied to its input circuit is rendered conductive to produce a positive output voltage the other cathode follower is rendered non-conductive.

References Cited in the file of this patent

UNITED STATES PATENTS

| | | |
|---|---|---|
| 2,581,456 | Swift | Jan. 8, 1952 |
| 2,747,030 | Nuckolls | May 22, 1956 |
| 2,762,914 | Peterson et al. | Sept. 11, 1956 |